March 23, 1965       B. LONG       3,174,840
APPARATUS AND PROCESS FOR DIFFERENTIAL TEMPERING OF GLASS
Filed Nov. 26, 1962       3 Sheets-Sheet 3
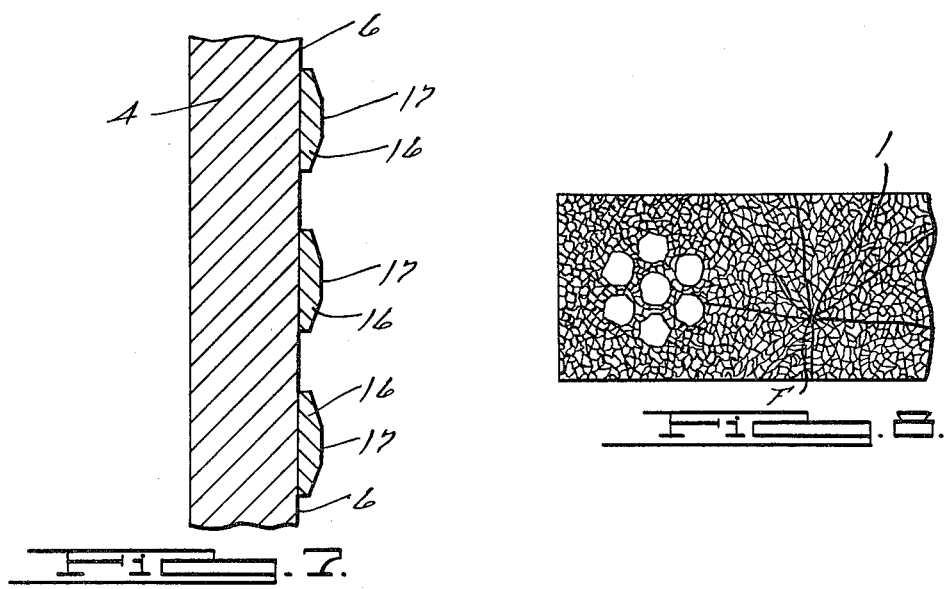
FIG. 7.
FIG. 8.
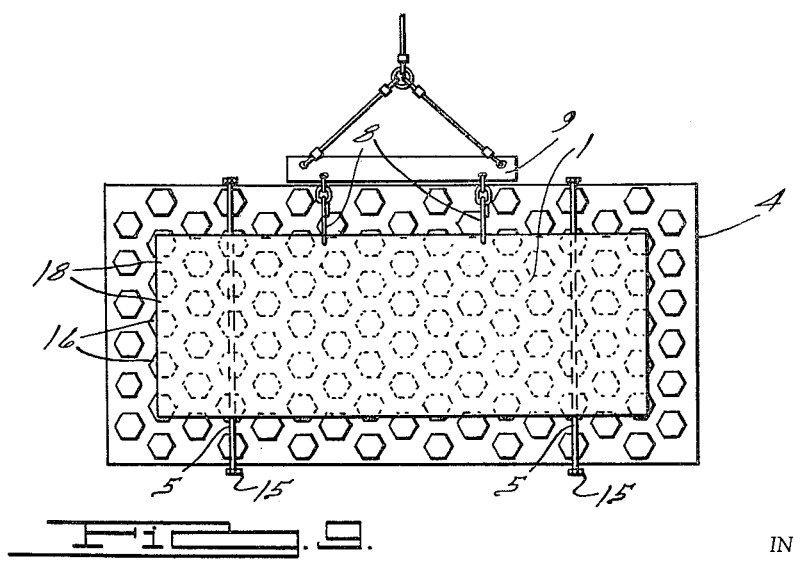
FIG. 9.
INVENTOR.
Bernard Long
BY
Harness, Dickey & Pierce
ATTORNEYS United States Patent Office 3,174,840
Patented Mar. 23, 1965

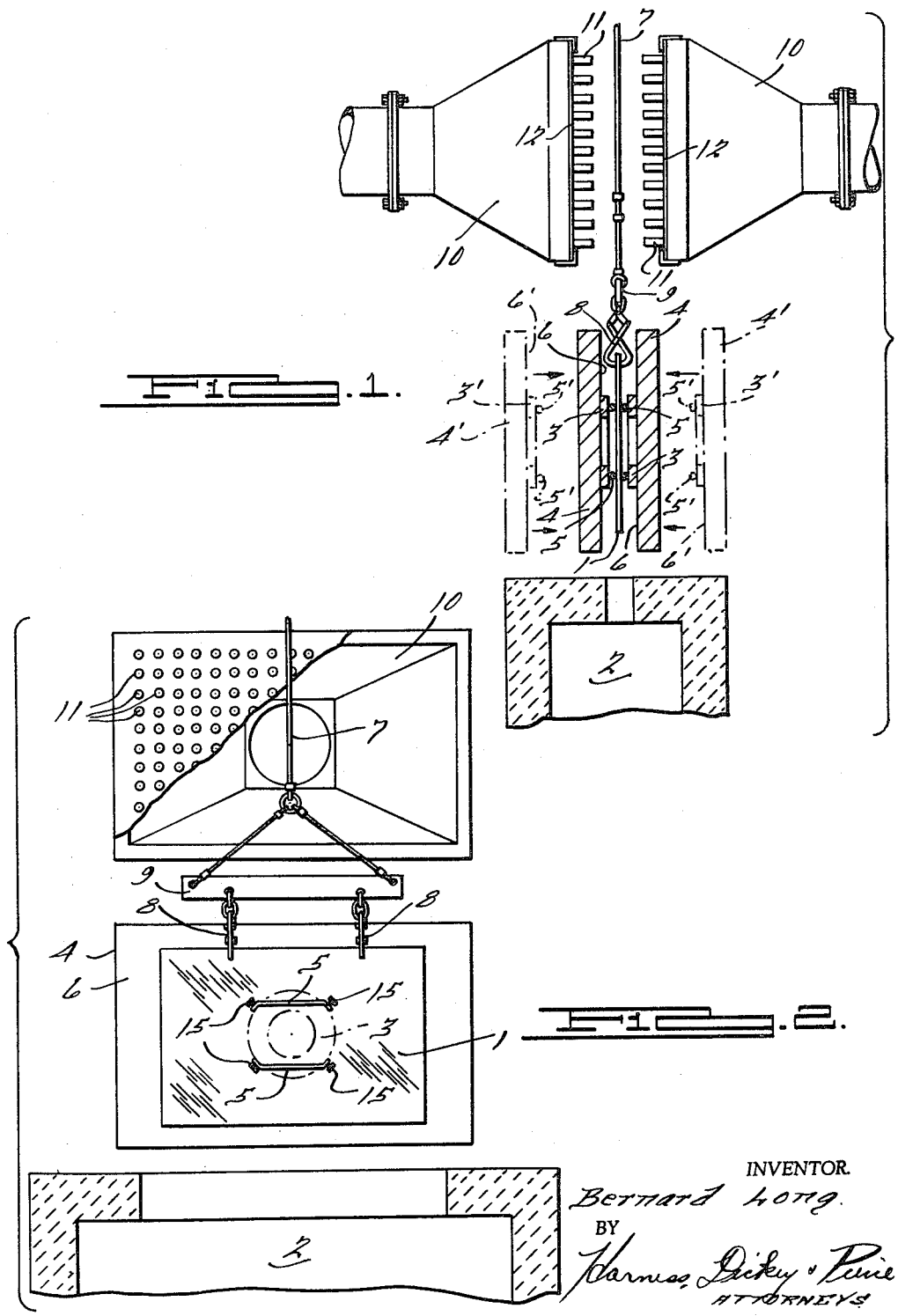

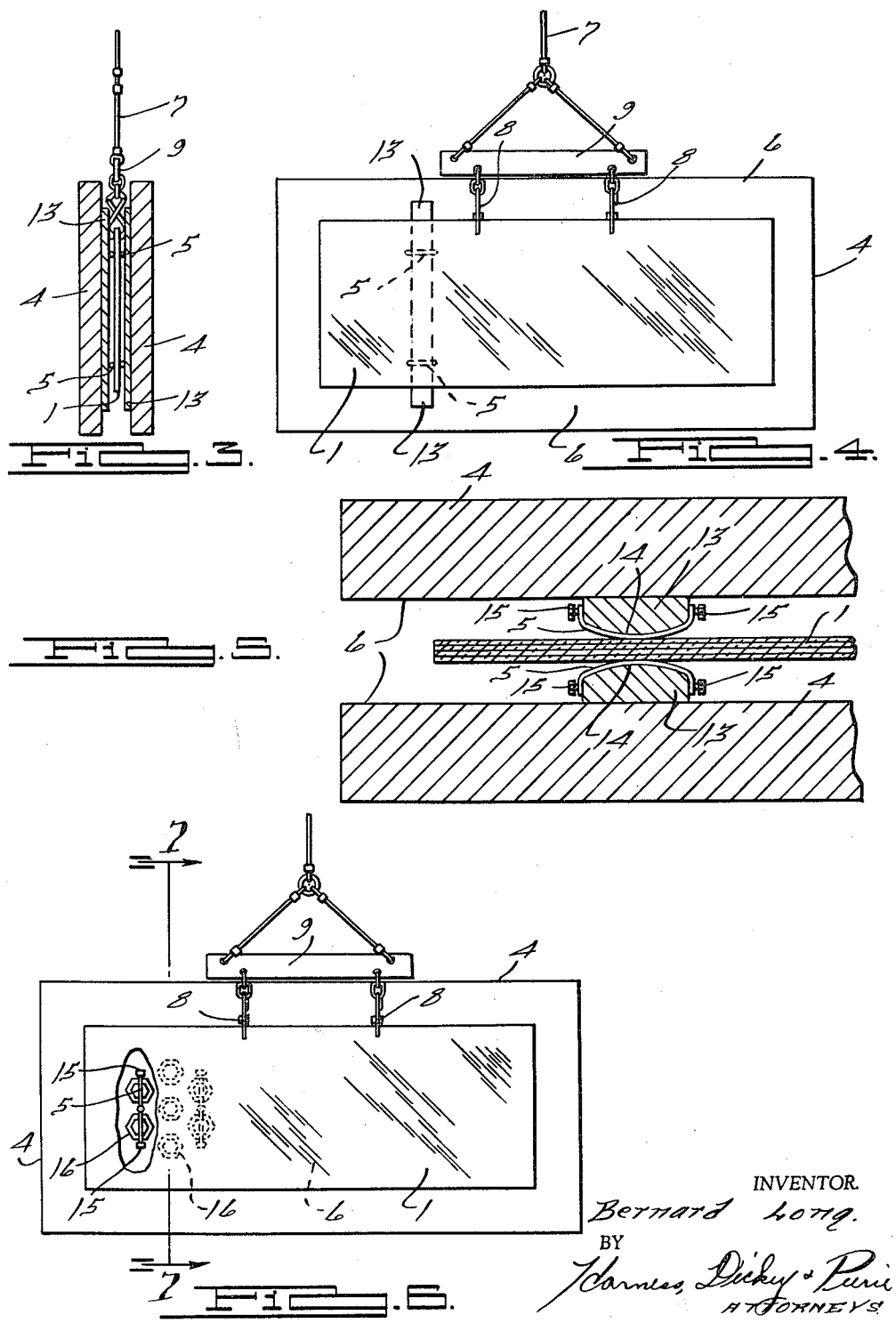

3,174,840
APPARATUS AND PROCESS FOR DIFFERENTIAL TEMPERING OF GLASS
Bernard Long, Paris, France, assignor to Glaces de Boussois, S.A., Paris, France, a corporation of France
Filed Nov. 26, 1962, Ser. No. 239,961
Claims priority, application France, Dec. 26, 1961, 883,037, Patent 1,317,263
7 Claims. (Cl. 65—115)

The present invention relates to a process for the differential tempering of flat or curved glass sheets, in particular, a glass sheet intended to be fitted as a windscreen in motor vehicles, generally of a thickness ranging between 5 and 6 millimeters (0.20 to 0.24 inch).

It is known practice to produce inside a strongly tempered sheet of glass one or more zones which are subjected to light or moderate tempering, generally designated as "reserved zones."

This designation is explained by the fact that, in case of rupture occurring at a point in a strongly tempered zone, none of the lines of fracture developing there can penetrate inside any of the reserved zones which consequently remain intact.

Reserved zones of this kind can be obtained by different processes, in particular by the process described in British patent specification No. 726,626, such process consisting in forming the reserved zone or zones while the sheet is allowed to remain for a period varying between 30 and 60 seconds inside a confined space having highly reflecting walls which are lightly heated, after it has been withdrawn from the furnace in which it has been raised to softening point.

With the help of water-cooled screens, the parts of the sheet which are to become the reserved zones are cooled, the rest remaining substantially at the temperature it had on leaving the furnace. Then the sheet is withdrawn from the confined reflecting space and is subjected over its whole surface to the action of a blower device to temper the sheet.

In this process, the localized cooling which determines the reserved zone is produced by radiation while the softened sheet is suspended inside the enclosed reflecting space.

As this manner of cooling is not very active, the sheet must remain for a relatively long period (30 to 60 seconds) in this confined space, which has the drawback of causing a general lowering of the temperature and consequently of making it a delicate if not difficult task to obtain the strong tempering desired outside the reserved zones.

Another drawback of the above process is that the contours or outlines of the reserved zones are not sufficiently clearly defined and in case of fracture or rupture they do not reliably stop the progress of the lines of fracture which develop in the heavily tempered zone.

A further drawback of this process is that it requires the provision of a closed confined space, the reflecting walls of which, facing the surfaces of the sheet, are heated.

The heating, closing and opening of the confined space greatly complicate the manner of working and, in consequence, increase the risk of failure.

An object of the present invention is to provide for substantially overcoming these drawbacks.

The process, according to the invention, comprises the steps of withdrawing a sheet of glass from a furnace in which it has been softened in a vertical position, locating the sheet between two vertical reflecting plates to which are symmetrically attached cooling elements having the outline of at least one reserved zone to be produced in the sheet and made of a material having a thermal diffusivity greater than 0.10 c.g.s., drawing the cooling elements symmetrically towards the faces of the softened sheet to within a distance of less than 30-hundredths of a millimeter (about 0.013 inch) for a period of less than 10 seconds to define the reserved zone in the sheet, withdrawing the cooling elements from the sheet, and conveying the sheet to a device which subjects the whole surface of the sheet to vigorous cooling which, in known manner, strongly tempers the parts of the sheet outside the reserved zone and subjects said zone to slight or moderate tempering.

It will be understood that, for the purpose of making the reserved zones, the process in accordance with the invention uses the cooling method referred to in the specification of pending application Serial No. 123,471.

Since the method of cooling is extremely vigorous, it need only be applied for less than 10 seconds, which secures the following two advantages:

(1) The simple utilization of two unheated cooling plates instead of a confined space with heated reflecting walls;

(2) The certainty of being able to provide, under satisfactory conditions, a strong tempering treatment to the parts of the sheet outside the reserved zones.

The process in accordance with the invention finds its principal application in the production of one or more reserved zones of different shapes and sizes inside flat or curved windscreens for motor vehicles.

The reserved zone or zones is or are generally arranged in the part of the windscreen which lies in the central part of the field of vision of the driver. As is well known, a reserved zone makes it possible to retain sufficient road visibility in the case of a fracture affecting the strongly tempered zone of the windscreen.

In an endeavor to retain sufficient visibility, efforts have hitherto been directed towards producing by differential tempering:

Either a simple isolated area of fairly large size sufficient for visibility purposes;

Or a reserved zone of narrow width extending from one edge to the opposed edge of the windscreen and forming a transverse barrier impeding the propagation of the rupture.

The process in accordance with the invention makes it possible easily to produce these two types of windscreen but, owing to its great flexibility, it permits windscreens to be made far more reliable, particularly in regard to visibility;

Provides a windscreen containing several reserved zones of small size, grouped in front of the driver;

And provides a windscreen containing a large number of reserved zones, lying close to each other, and evenly distributed over the whole surface.

In the operation of the invention, the reflecting plates carrying the cooling elements are preferably made of metal which has been coated with a substance having a high reflection factor for the radiations of softened glass, for instance, mild steel plates with a polished chromium plating, brass plates with a polished silver plating, or aluminum plates to which a high gloss surface has been imparted by conventional treatment.

The cooling elements can be combined with the plates or can be fixed thereto. As has already been stated, they are made of a material having a thermal diffusivity greater than 0.10 c.g.s. (centimeter gram second) units, for example, commonly available metals such as ordinary steel, stainless steel, brass, etc. Graphite can also be used.

The surfaces of these cooling elements obviously have the same outlines as the reserved zones which they are required to determine on the faces of the sheets. The depth of their relief with reference to the surface of the reflecting plates varies slightly with the nature of the material.

This depth can be constant over the whole area of the active faces. However, it has been found advantageous to decrease the depth perceptibly at the periphery in order slightly to decrease the cooling effect. The said advantage consists in obtaining a more gradual change when passing over the surface of the sheet from the strongly tempered zone to the reserved zones; this advantage is particularly important in the case of a reserved zone in the form of a transverse strip or barrier and in the case of a number of hexagonal reserved zones adjacent to each other.

In accordance with pending application Serial No. 123,471 mentioned above, the lowering of the temperature of the reserved zones under the action of the cooling elements is the more rapid the smaller the gap separating them from the faces of the sheet. This gap can be regulated by using spacing pieces of the same type as those mentioned in the said application, for example, calibrated wires or calibrated grains which are applied to the active faces of the cooling elements.

To give some indication, spacing pieces of a thickness ranging between 10- and 15-hundredths of a millimeter (0.004 to 0.006 inch) are currently used to determine the reserved zones in sheets of a thickness of 5 to 6 millimeters (0.20 to 0.24 inch), using cooling elements which are applied for a period of between 5 to 10 seconds.

The final tempering can be carried out by means of air jets or by cooling between plates in accordance with the process described in the specification of pending application Serial No. 123,471.

An embodiment of the invention will be described by way of example only with reference to the accompanying drawings in which:

FIGURE 1 illustrates in vertical section a softened sheet vertically suspended between the furnace and the tempering device in the intermediate position in which it is symmetrically cooled by two cooling elements in the form of a circular ring;

FIGURE 2 illustrates in elevation the sheet shown in FIGURE 1 suspended in front of one of the reflecting plates;

FIGURE 3 illustrates in vertical section a softened sheet in the intermediate position in which it is symmetrically cooled by two small cooling bars which cause to be formed on the surface of the sheet a cooled strip which, after tempering, forms a "transverse barrier."

FIGURE 4 illustrates in elevation the sheet shown in FIGURE 3 suspended in front of one of the reflecting plates;

FIGURE 5 is a horizontal section on a larger scale of the sheet shown in FIGURE 4 between the cooling bars;

FIGURE 6 illustrates a windscreen suspended in front of a reflecting plate carrying a group of seven separate small cooling plates comprising a central hexagonal plate surrounded at a close distance by a crown of six identical hexagonal plates;

FIGURE 7 is a section along the line VII—VII of the group of hexagonal plates;

FIGURE 8 illustrates diagrammatically how the windscreen in FIGURE 6 splinters when a seat of fracture is produced accidentally outside the seven reserved zones at any point in the strongly tempered part; and FIGURE 9 shows a windscreen suspended in front of a reflecting plate carrying a large number of evenly spaced small hexagonal cooling plates.

In FIGURES 1 and 2, the softened sheet 1 which has just been withdrawn from the furnace 2 is in the intermediate position in which, for a period of less than 10 seconds, a reserved zone is locally defined on it in the form of a circular ring.

For this purpose, the sheet 1, of a thickness between 5 and 6 millimeters (0.20 and 0.24 inch), is cooled very vigorously by the cooling elements 3 each of which is in the form of a ring of, for example, mild or stainless steel. The elements 3 are carried by plates 4 made of mild steel and are spaced a distance of less than 30-hundredths of a millimeter (0.013 inch) from the sheet by nickel chromium wires 5 serving as spacing pieces, the ends of which are secured to the elements 3 by pressure applying screws 15.

At the moment when the sheet 1 is withdrawn from the furnace 2, the plates 4 are in the position 4' shown in broken lines; as soon as the sheet 1 comes to rest, the plates 4 are rapidly drawn towards the sheet by known means (not shown in the drawing).

Owing to the highly reflecting coating applied to the inner faces 6 of the plate 4, the heat loss from the sheet 1 by radiation is negligible during the relatively short period (less than 10 seconds) during which the sheet is held in the intermediate position.

The sheet 1 is connected to a lifting cable 7 by means of ordinary grips 8 controlled by a locking bar 9.

As soon as cooling by the rings 3 is finished, the plates 4 are withdrawn and the sheet is raised into the tempering position. It is cooled there in conventional manner by blast pipes 10 directing jets of air through a number of nozzles 11 welded on outlet plates 12 of the pipes 10.

Once it has again attained room temperature, the sheet 1 has a reserved zone slightly or moderately tempered in the form of a ring, the rest of the sheet being strongly tempered.

It is known that in the case in which the center or focus of rupture is produced outside the ring, the lines of fracture are stopped by the outer periphery of the ring. In the case in which the seat of rupture lies inside the ring, it is the inner periphery which stops the propagation of the rupture.

In FIGURES 3 and 4, the reflecting plates 4 which are made of ordinary steel each carry a small bar 13 made of ordinary steel arranged perpendicularly to the major axis of the associated plate and the length of which is considerably greater than the breadth of the sheet 1.

In the intermediate position between the furnace and the tempering position, a reserved zone is locally defined on the sheet in the form of a cross strip which, after tempering, becomes a "transverse barrier" stopping on its longitudinal sides and also at its ends, owing to the cooling performed on the sections by the parts of the small bars 13 projecting beyond the sheet 1, the lines of fracture originating in the strongly tempered zone to the left and the right.

It is known from U.S. Patent Number 2,866,299 that such a transverse barrier, placed in a good position inside a strongly tempered windscreen, gives the driver of a motor vehicle a reliable assurance of visibility in the case in which rupture is produced by impact.

In FIGURE 5, the softened windscreen 1 of FIGURE 4 is shown on a larger scale between the small cooling bars 13 secured on the reflecting faces 6 of the plates 4.

Attention should be directed to the fact that the active face 14 of each of the small bars 13 is not flat; it is slightly curved, which makes it possible to effect cooling of graduating intensity decreasing from the center towards the edges and to level off, until they are made practically imperceptible, the slight differences in level usually found at the edges of the transverse barriers.

The ends of the spacing wires 5 are secured on the side edges of the bars 13 by means of the pressure applying screws 15.

In FIGURE 6, the reflecting plate 4 carries in relief seven small cooling plates 16.

The two spacing wires 5 are vertical; their ends are secured by means of screws 15.

In FIGURE 7, it wil be seen that the central part 17 of each plate is at a slightly greater distance from the face 6 than the marginal edge portion of the plate.

FIGURE 8 shows a partial view of a windscreen 1 with seven hexagonal reserved zones after it has been fractured by impact at a point F.

The reserved zones then assume an approximately circular form; they are surrounded by cracks of the same type as those produced in the strongly tempered zone outside the reserved zone.

Road visibility through these seven small windows or peepholes arranged in a group makes it possible to drive a motor vehicle at a moderate speed.

In FIGURE 9, the reflecting plate 4 has a considerable number of small cooling plates 16 evenly spaced apart as indicated by 18 in all directions. By means of two such reflecting plates it is possible to cover with reserved zones the whole windscreen 1, the outline of which lies inside the zone equipped with small plates. When the narrow band enclosing these reserved zones on all sides fractures following impact, the windscreen contains a large number of intact discs which permit satisfactory visibility.

When the seat of rupture occurs in a reserved zone, two cases may arise:

(a) Only the reserved zone is broken;

(b) The rupture extends to the band surrounding the small plates.

In the first case, there is practically no loss of visibility through the windscreen.

The second case is similar to that considered in the first instance.

The spacing 18 is adjusted in accordance with the size of the plates. It may be advantageous to reduce this spacing to approximately the thickness of the sheet, viz. approximately 6 millimeters (0.24 inch).

While several commercially practical embodiments of the invention have been described and illustrated herein somewhat in detail, it will be understood that various other changes and modifications may be made as may come within the purview of the accompanying claims.

What is claimed is:

1. A process for differential tempering of sheet glass, comprising the steps of heating the glass sheet in a furnace to a predetermined softened condition, withdrawing a glass sheet from the furnace in which it has been softened to a relatively cool environment compared to the furnace, locating the sheet vertically between two vertical reflecting plates to which are symmetrically attached cooling elements having the outline of at least one reserved zone to be produced in the sheet and made of a heat conductive material having a thermal diffusivity greater than 0.10 c.g.s., the reserved zone having an area substantially less than that of the entire glass sheet and the combined thickness of each cooling element and the adjacent portion of its reflecting plate being greater than the thickness of the glass sheet, drawing the cooling elements symmetrically towards the faces of the softened sheet to within a distance of less than 30-hundredths of a millimeter for a period of less than 10 seconds to define the reserved zone in the sheet, withdrawing the cooling elements from the sheet, and subjecting the whole surface of the sheet to vigorous cooling to highly temper the parts of the sheet outside the reserved zone and subject said zone to moderate tempering.

2. A process as claimed in claim 1 in which each of the cooling elements has, relative to the associated reflecting plate, a relief decreasing gradually from its central part towards its periphery.

3. A process as claimed in claim 1 in which a plurality of cooling elements are attached to each reflecting plate to produce a plurality of reserved zones in the sheet.

4. A process as claimed in claim 1 in which the cooling element attached to each plate is in the form of a ring to produce a circular cooling zone in the sheet.

5. A process as claimed in claim 1 in which the cooling element attached to each plate is in the form of a bar arranged perpendicularly to the major axis of the plate to produce a reserved zone in the form of a strip extending transversely of the sheet.

6. A process as claimed in claim 3 in which the cooling elements are in the form of small plates to produce the plurality of reserved zones in the sheet.

7. Apparatus for differentially tempering glass sheets comprising a pair of spaced vertically positioned reflecting plates, means for supporting a softened glass sheet therebetween, a cooling element on each of said reflecting plates, said cooling elements being positioned opposite one another and each having the outline of a reserved zone to be produced in the sheet, said cooling elements being made of a heat conductive material having a thermal diffusivity greater than 0.10 c.g.s., the surface area of each of said cooling elements being substantially less than that of the entire glass sheet and the combined thickness of each cooling element and the adjacent portion of its reflecting plate being greater than the thickness of the glass sheet to be tempered, means for moving said reflecting plates and cooling elements toward the faces of the softened sheet of glass disposed therebetween, means for positioning each of said cooling elements within a distance of less than 0.30 mm. from the opposite faces of the glass sheet, respectively, to define the reserved zone in the glass sheet, means for withdrawing said cooling elements from the glass sheet, and means for vigorously cooling the entire area of the glass sheet to highly temper the parts of the sheet outside the reserved zone and to subject the zone to moderate tempering.

References Cited by the Examiner

UNITED STATES PATENTS 1,895,548  1/33  Lebel _____ 65—115
3,081,209  3/63  Chan et al. _____ 65—115 X

FOREIGN PATENTS 726,626  3/55  France.

DONALL H. SYLVESTER, *Primary Examiner.*